United States Patent [19]
Melman

[11] Patent Number: 5,163,113
[45] Date of Patent: Nov. 10, 1992

[54] LASER-TO-FIBER COUPLING APPARATUS

[75] Inventor: Paul Melman, Newton, Mass.

[73] Assignee: GTE Laboratories Incorporated, Waltham, Mass.

[21] Appl. No.: 555,129

[22] Filed: Jul. 19, 1990

[51] Int. Cl.[5] .............................................. G02B 6/42
[52] U.S. Cl. ........................................ 385/31; 385/49; 385/88
[58] Field of Search ............... 350/96.15, 96.17, 96.18, 350/96.20; 357/17, 30, 74; 385/31, 33, 34, 39, 47, 48, 49, 88

[56] References Cited

U.S. PATENT DOCUMENTS

| | | | |
|---|---|---|---|
| 4,130,343 | 12/1978 | Miller et al. | 350/96.15 |
| 4,627,687 | 12/1986 | Dorn et al. | 350/96.20 |
| 4,756,590 | 7/1988 | Forrest et al. | 350/96.15 |
| 4,871,224 | 10/1989 | Karstensen et al. | 350/96.15 |

FOREIGN PATENT DOCUMENTS

| | | | |
|---|---|---|---|
| 2751915 | 7/1978 | Fed. Rep. of Germany | 350/96.15 |
| 52-2442 | 1/1977 | Japan | 350/96.15 |
| 57-195209 | 11/1982 | Japan | 350/96.15 |

OTHER PUBLICATIONS

Ota et al., "Twelve-Channel Individually Addressable InGaAs/InP p-i-n Photodiode and InGaAsP/InP LED Arrays in a Compact Package", Journal of Light. Tech. vol. LT-5, No. 8, pp. 1118-1122 (Aug. 1987).

Lee et al., "Simple Side Coupler for Coupling Between Laser Diode and Single-Mode Optical Fiber", Applied Optics, vol. 26, No. 12, pp. 2294-2296 (Jun. 1987).

Primary Examiner—John D. Lee
Attorney, Agent, or Firm—Victor F. Lohmann, III

[57] ABSTRACT

An apparatus for coupling light from a laser chip into an untreated, unetched optical fiber includes a mounting block to which is attached the chip, and a substrate carrier attached to the block and having a channel space extending axially through the substrate carrier. The fiber has a beveled end with an inner and outer face and is positionable within the channel space such that light emitted by the laser chip strikes the inner face of the beveled end and is totally internally reflected into the fiber core. In an alternate coupling assembly, light from the laser chip is reflected by a mirror to form a beam spot on the inner face of the beveled end where it is likewise totally internally reflected into the fiber.

14 Claims, 2 Drawing Sheets

LASER-TO-FIBER COUPLING APPARATUS

FIELD OF THE INVENTION

This invention relates to optical component packaging and, more particularly, to an apparatus for coupling light from a light-generating chip into an untreated, unetched optical fiber.

BACKGROUND OF THE INVENTION

Attachment of fibers, and in particular single-mode fibers, to semiconductor lasers requires very accurate positioning of the fiber core with respect to the lasing spot of the laser to achieve optimal coupling of the light. The conventional technique of butt-coupling of cleaved fibers requires fiber alignment, lateral to the beam propagation direction, to within 0.5 $\mu$m with respect to the laser beam center in order to ensure good coupling efficiency. The coupling efficiency can be further improved by tapering the fiber end or lensing the fiber tip. However, these modifications to the fiber further increase the precision necessary for accurate fiber alignment.

The alignment accuracy in the axial direction (along the direction of beam propagation) is more relaxed than in the lateral direction since the coupling efficiency is less sensitive to the precise distance of the fiber to laser than to the fiber lateral displacement away from the center of the laser beam. In the conventional laser-to-fiber butt-coupling assembly of FIG. 1, for example, the positioning in the lateral y-direction is the least precise but is the most critical since the coupling efficiency is more sensitive to variations in the y-direction than in the axial x-direction. For an efficient pigtailing operation, it is desirable to locate the fiber in a fiber receiving conduit, such as a V-groove, to facilitate a permanent fiber attachment in the aligned position. Placing the fiber in such a V-groove, however, allows adjustment of the fiber position in the least critical dimension (x-direction) only, namely along the fiber axis.

OBJECTS OF THE INVENTION

It is a principal object of the present invention to obviate the above-noted and other disadvantages of the prior art.

It is a further object of the present invention to configure the geometry of a coupling assembly in such a way that the maximum coupling in the least accurate or least controllable dimensions can be achieved simply by sliding the fiber along a fiber-receiving groove before it is permanently attached to the groove.

SUMMARY OF THE INVENTION

In one aspect of the present invention, an apparatus for coupling a fiber to a light-emitting source such as a laser chip includes a mounting block to which is attached the light-emitting source, and a substrate carrier also attached to the block and having a channel space extending axially through the substrate. An untreated fiber having a beveled end with an inner and outer face is positionable within the channel space such that light emitted from said light-emitting source strikes the inner face of the beveled end and is totally internally reflected into the fiber. In another aspect of the present invention, the light-emitting source is attached to a source mount fixed to the mounting block. A mirror is positioned on the source mount in relation to the light-emitting source so that light emitted from this source is reflected by the mirror to form a beam spot on the inner face of the beveled end where it is totally internally reflected into the fiber.

DETAILED DESCRIPTION OF PREFERRED EMBODIMENT

Figure 1:
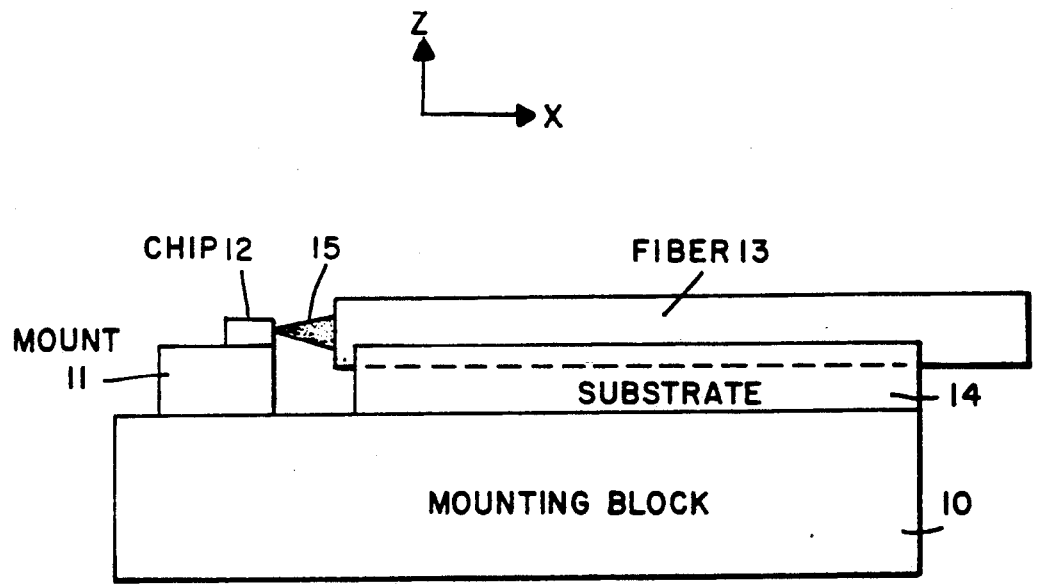
FIG. 1 is a lateral view of a conventional laser-to-fiber coupling apparatus.

In FIG. 1 is shown a conventional coupling apparatus wherein a fiber 13 positioned in a grooved substrate 14 is butt-coupled to a laser chip 12 attached to a mount 11. The entire assembly is placed on a mounting block 10. An optical wavefront 15 is emitted by laser chip 12 and propagates axially in the x-direction to fiber 13. As noted before, the coupling efficiency from chip 12 to fiber 13 is most affected by misalignments in the least controllable and least precise lateral y-direction.

The present invention concerns a coupling apparatus whose geometry does not place stringent control tolerances on lateral alignment, but rather achieves alignment by slidably positioning the fiber in the more precise and controllable axial direction. In both embodiments of FIGS. 2 and 3, the assembly couples the laser beam into the fiber core through a beveled end of the fiber.

Figure 2:
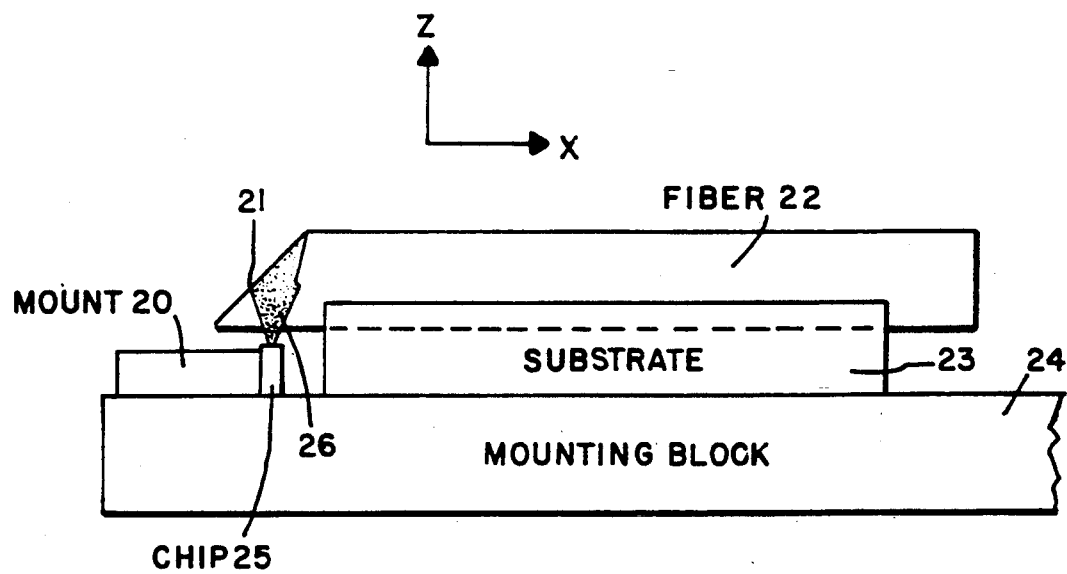
FIG. 2 is a lateral view of a coupling assembly according to a first embodiment of the present invention.

FIG. 2 shows a laser-to-beveled fiber coupling geometry in accordance with a first embodiment of the present invention. The coupling apparatus includes a laser mount 20 to which is attached a laser chip 25. Adjacent to this laser assembly is a substrate 23 having a fiber-receiving channel extending axially in the x-direction through the substrate. Preferably, the substrate is etched to form a V-groove geometry. A fiber 22 having a beveled end 21 is slidably positioned in the substrate channel, as indicated by the axially-extending dotted lines, so that the beveled end is above the chip 25. In this configuration of the present invention, the laser beam propagates through the side of the cylindrical fiber 22 as wavefront 26 and is totally internally reflected by the beveled end 21 into the core of fiber 22. The cylindrical fiber surface focuses the beam in one plane, resulting in an oval spot on the beveled surface. The maximum percentage of power which can be coupled using this geometry is very close to that which is achievable by the conventional technique shown in FIG. 1 illustrating butt-coupling into a cleaved fiber.

The advantage of the beveled fiber assembly over the butt-coupling apparatus is the relative insensitivity of the present invention to variations in the geometrical parameters of the different parts of the alignment assembly such as the groove dimensions and fiber parameters. A further advantage derives from the absence of any special fiber fabrication steps or treatment operations such as etch-in processing.

Although reduction of the fiber outside diameter through etch-in processing has been demonstrated and can lead to improved coupling efficiency, this reduction introduces additional complexity and a degree of uncontrollability into the processing which is not present in this invention. Disadvantageously, this increase in the coupling efficiency due to the reduction in fiber diameter occurs at the expense of increased sensitivity to fiber alignment. In particular, when coupling to an array of light emitting sources, dimensional uniformity is of such critical importance that fiber reduction would want to be avoided because it adds another degree of difficulty to the control processing.

The tolerance of the v-groove dimensions, which is very critical in butt-coupling, is very relaxed in the geometry of the present invention because the tolerances only affect the axial distance between the fiber and the laser facet. Similarly, variations in fiber diameter, which again are critical in butt coupling, have negligible effect in this geometry. Because of the adjustability of the fiber position along the v-groove, the precise distance of the lasing spot from the fiber end need not be predetermined. This allows one to use p-side up or down mounted lasers. This flexibility turns out to be important, especially when coupling into laser arrays where fabrication of rear facet detectors may be complicated with p-side-down configurations.

Figure 3:
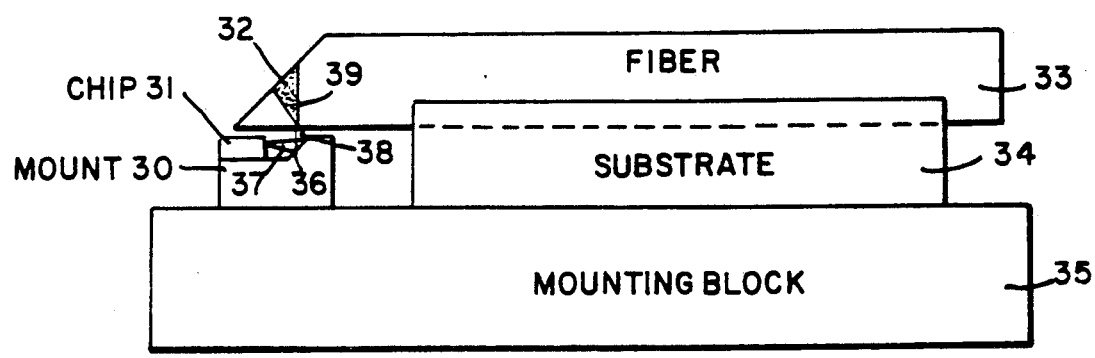
FIG. 3 is a lateral view of a coupling assembly according to a second embodiment of the present invention.

The laser to beveled fiber coupling geometry may also be implemented in accordance with the assembly shown in FIG. 3. The assembly includes a laser chip 31 attached to a laser mount 30 which is affixed to block 35. In front of the emitting region of chip 31 is a mirror 36 affixed to mount 30 and preferably angled at 45° relative to the propagation direction of laser beam 37. A fiber 33 having a beveled end 32 is slidably positioned in a fiber-receiving channel of a substrate 34 attached to block 35. The mirror is sufficiently angled such that the laser light 37 is reflected by the mirror 36, coupled as reflected wavefront 38 into beveled fiber 32 through the cylindrical fiber surface as was described above with regard to FIG. 2, focused on the inner surface of the beveled edge 32 to form beam spot 39, and internally reflected into the core of fiber 32. Other variations of this coupling scheme can include light emitting diodes instead of lasers, or multi-mode fibers instead of the single-mode fiber described above.

What is claimed is:

1. A coupling apparatus, comprising:
   a mounting block;
   a laser in a fixed position on said mounting block;
   a substrate carrier attached to said block and having a channel space extending axially through said substrate carrier; and
   an untreated single-mode optical fiber having a beveled end with an inner and outer face, and having a cylindrically-shaped underside surface;
   said fiber being positionable within said channel space such that light emitted from said laser propagates without obstruction before impinging on the cylindrical underside surface of said fiber, strikes the inner face of said beveled end, and is totally internally reflected into said fiber.

2. The coupling apparatus as recited in claim 1 wherein said laser is a diode-laser.

3. A coupling apparatus, comprising:
   a mounting block;
   a source mount fixed to said mounting block;
   a light-emitting source attached to said source mount;
   a substrate carrier attached to said mounting block and having a channel space extending axially through said substrate carrier;
   an untreated optical fiber having a beveled end with an inner and outer face; and
   a mirror positioned on said source mount for reflecting light emitted by said source;
   said fiber being positionable within said channel space such that light reflected by said mirror forms a beam spot on the inner face of said beveled end and is thereafter totally internally reflected into said fiber.

4. The coupling apparatus as recited in claim 3 wherein said light-emitting source is a diode.

5. The coupling apparatus as recited in claim 3 wherein said light-emitting source is a laser.

6. The coupling apparatus as recited in claim 3 wherein said fiber is single-mode.

7. The coupling apparatus as recited in claim 3 wherein said fiber is multimode.

8. An apparatus for coupling light from a laser into an untreated single-mode optical fiber having a cylindrically-shaped underside surface, and having a beveled end with an inner and outer face, comprising:
   a mounting block to which is attached said laser; and
   a substrate carrier attached to said block and having a channel space extending axially through said substrate carrier, wherein said fiber is positionable within said channel space such that light emitted by said laser propagates without obstruction before impinging on the cylindrical underside surface of said fiber, strikes the inner face of said beveled end, and is totally internally reflected into said fiber.

9. The coupling apparatus as recited in claim 8 wherein said laser is a diode-laser.

10. An apparatus for coupling light from a light-generating chip into an untreated optical fiber having a beveled end with an inner and outer face, comprising:
    a mounting block;
    a source mount fixed to said mounting block;
    a substrate carrier attached to said mounting block and having a channel space extending axially through said substrate carrier; and
    a mirror positioned on said source mount for reflecting light emitted by said chip;
    wherein said fiber is positionable within said channel space such that light reflected by said mirror forms a beam spot on the inner face of said fiber beveled end and is thereafter totally internally reflected into said fiber.

11. The coupling apparatus as recited in claim 10 wherein said light-generating chip is a diode.

12. The coupling apparatus as recited in claim 10 wherein said light-generating chip is a laser.

13. The coupling apparatus as recited in claim 10 wherein said fiber is single-mode.

14. The coupling apparatus as recited in claim 10 wherein said fiber is multimode.

* * * * *